US006738162B1

(12) United States Patent
Martens et al.

(10) Patent No.: US 6,738,162 B1
(45) Date of Patent: May 18, 2004

(54) DIGITAL PRINTER FOR AVOIDING MOIRE PATTERNS BY USING A DITHERING MASK AND ANGULAR ROTATION BETWEEN PRINT HEAD AND PRINT MEDIUM TO SIMULATE ANALOG PRINTER HALFTONING OF COLOR IMAGES

(75) Inventors: Marco Martens, Chappaqua, NY (US); Ravishankar Rao, White Plains, NY (US); Gerhard R. Thompson, Wappingers Falls, NY (US); Charles B. Tresser, Mamaroneck, NY (US); Chai W. Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/457,325

(22) Filed: Dec. 9, 1999

(51) Int. Cl.[7] ............................................. B05C 17/06
(52) U.S. Cl. ..................................... 358/3.32; 358/3.29
(58) Field of Search ................................. 358/1.9, 3.32, 358/3.09, 3.2, 296, 2.1, 3.29

(56) References Cited

U.S. PATENT DOCUMENTS 4,693,465 A * 9/1987 Svyatsky et al. ........... 271/274
4,909,142 A * 3/1990 Bubley ....................... 101/115
6,053,101 A * 4/2000 Hix ............................ 101/126
6,101,938 A * 8/2000 Adams ....................... 101/126

OTHER PUBLICATIONS

Zenographics SuperPrint User Manual, copr. 1994, pp. 5–22–5–23.*

* cited by examiner

Primary Examiner—Thomas D. Lee
Assistant Examiner—Stephen Brinich
(74) Attorney, Agent, or Firm—Whitham, Curtis & Christofferson, P.C.; Stephen C. Kaufman

(57) ABSTRACT

A semi-digital printer includes a print head assembly that prints an image on a sheet of paper that has been mounted onto a turntable, and a rotating means which rotates the turntable so that the print head assembly ejects ink or toner onto the sheet of paper at one or more predetermined angles. The printing may be halftone or color. If the print head assembly includes more than one print head, the rotating means rotates the turntable to a different angle for each print head. By rotating the turntable in this manner, the printer records an image at any angle (0° to 360°) precisely (i.e., without having to perform the angular approximations required by conventional digital printers). As a result, a printed image of improved quality is produced. Alternatively, the semi-digital printer may be configured so that the print head assembly rotates relative to the paper.

30 Claims, 7 Drawing Sheets

DIGITAL PRINTER FOR AVOIDING MOIRE PATTERNS BY USING A DITHERING MASK AND ANGULAR ROTATION BETWEEN PRINT HEAD AND PRINT MEDIUM TO SIMULATE ANALOG PRINTER HALFTONING OF COLOR IMAGES

BACKGROUND OF THE INVENTION

1. Field of the Invention

The present invention generally relates to halftoning techniques in printers, and more particularly to an apparatus for halftoning which combines advantages of digital printing and offset printing.

2. Background Description

Most printers today can print in only a limited number of colors. Digital halftoning is a technique for printing a picture (or more generally displaying it on some two-dimensional medium) using small dots with a limited number of colors such that it appears to consist of many colors when viewed from a proper distance. For example, a picture printed with black and white dots may appear to contain various shades of gray when viewed from a distance.

The fastest and most commonly used methods for digital halftoning are dithering algorithms which use threshold arrays, also called dither matrices or dither masks. The principle of this method, as illustrated in FIG. 1, is well known. In the case of greyscale images, the method allows one to generate a matrix N of discrete values at 113 (typically 0 or 1, where 1 means a pixel is printed and a 0 means nothing is printed) from an image I at 111 using a dithering mask (a smaller matrix of threshold values) at 112. This process involves comparing at 114 a specific image value with a specific mask value, and then generating a 1 if the image value is greater than the mask value and 0 otherwise. Various masks can be devised, according to the needs of precise applications, and several methods to devise masks with good performance have been disclosed. See, for instance, U.S. Pat. Nos. 5,111,310 to Parker et al. and 5,917,951 to Thompson et al. and pending U.S. application Ser. No. 08/909,535 to Thompson et al.

Dithering algorithms are used both in digital printers (such as laser printers and ink jet printers) and analog printers such as offset printers.

In a color printer, the color is decomposed into fundamental colors, usually cyan (denoted C), yellow (denoted Y), and magenta (denoted M), and black (denoted K). During printing, several passes are used, one per color. More recently, other colors may be used. (For simplicity of presentation, the most common case of four color (CMYK) printing will be assumed, although one skilled in the art can appreciate that the present invention may easily be adapted to other or more general cases.)

In traditional (analog) color printing, where halftone dots are placed at will on the mask, the same mask is employed for all colors, except that each color mask is given a different angle in order to avoid moire patterns. This results in small rosettes which constitute the fundamental small scale texture of all offset prints.

In the case of digital printing, where all pixels are points on a square or rectangular lattice, some rotations of a given mask are incompatible with the lattice. Optimal choices of rotation angles for CMYK are 75 degrees, 15 degrees, 90 degrees, and 45 degrees, respectively. Of these angles, only the 90 and 45 degree rotations can be implemented on a square lattice. The commonly used 15 degree rotation of an analog mask cannot be aligned with a square lattice. Hence, in the digital domain, one has to compromise and choose and angle that is close to 15 degrees and yields perfect alignment with a square lattice. For instance, an angle of 14.036 degrees (obtained by a displacement of 4 units along the x-axis and a displacement of 1 unit along the y-axis) yields perfect alignment with a square lattice.

Because non-optimal angles must be used, the output quality in digital printers suffers from more noticeable moire patterns than is evident in conventional analog printers. Furthermore, different masks must be generated for each angle. This is a considerable problem, as generating even a single mask with good performance has proven difficult. These drawbacks are discussed in detail, for example, in the text *Optical Color Technology for Electronic Imaging Devices* by Kang, Henry R. (Bellingham, Wash., USA:SPIE Optical, 1997), which is mentioned here as a general reference for color digital printing.

In U.S. Pat. No. 5,146,242 to Zielinski, a device for controlling the angular alignment of a writing device is disclosed.

3. Problem to be Solved

In view of the foregoing considerations, it would be advantageous to combine the benefits of digital printing (such as flexibility and low cost for a small number of prints) with the benefits of analog printing without realizing their disadvantages, and more specifically to do so by using a single mask at several angles. The present invention offers a way to combine these benefits in a single apparatus.

SUMMARY OF THE INVENTION

It is an objective of the present invention to provide a printing apparatus which performs digital printing (for instance, laser or ink jet) using a single mask which may be rotated at different angles, thereby forming a semi-digital printer which realizes the benefits of digital printing and analog printing without achieving their disadvantages.

It is another objective of the present invention to achieve the aforementioned objective by providing a semi-digital printer having a print head assembly which is aligned relative to a sheet of paper to be printed on, instead of in a predetermined, fixed position.

It is another objective of the present invention to provide a semi-digital printer which orients its print head assembly in such a manner that each print head prints an orthogonal array of dots at different angles of rotation relative to the paper, the different angles of rotation being achieved by rotating either the paper or the print head assembly. The orthogonal array of dots printed by each head at its respective angle of rotation advantageously allows for the use of a dither mask, for example, to generate, for example, a halftone or color image which is oriented precisely at the chosen angles, a feature which is not provided by conventional digital printers.

These and other objectives are achieved by providing a semi-digital printer which, according to a first embodiment, includes: a print head assembly that prints an image on a sheet of paper mounted onto a turntable; and a rotating means which rotates the turntable to at least one predetermined angle relative to the print head assembly. In operation, the rotating means rotates the turntable so that the at least one print head in the print head assembly ejects ink or toner onto the sheet of paper at the predetermined angle. Preferably, the print head assembly includes multiple print heads, each of which prints either the same color of ink or toner (e.g., black) or different colors (CMYK). When multiple print heads are included, the rotating means advantageously rotates the turntable at different predetermined angles, one for each color. By rotating the turntable in this manner, the printer of the present invention records an image at any angle between −45° and +45° precisely (i.e., without having to perform the approximation required by conventional digital printers at, for example, 15° and 75°), thereby producing a printed image of improved quality. Further, to increase the speed of printing, a look-up table may be used to pre-store rotational coordinates at various angles. The rotating means may then access the look-up table when printing is required.

A second embodiment of the printer of the present invention is similar to the first embodiment, except that in the second embodiment the print head assembly is mounted on a turntable and rotated by a rotating means relative to a sheet of paper.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In a conventional digital printer, the printing engine which defines the placement of the dots of any color to be printed, be it a laser or ink jet print head (the term "print head" will be used herein as a generic word for this engine), is confined to move on an axis perpendicular to the direction of paper feed. There is usually one gun per color, so four guns are typically used under the standing hypothesis of a CMYK printer. The set of possible printed dots on a given page is thus on a square or rectangular lattice. The same lattice is usually used for all colors, except for misalignments which are frequent defects of printers (these misalignments can cause large objectionable moire patterns when one tries to use a single mask without rotation).

The present invention represents a significant improvement in the art because it combines the benefits of digital printers and analog printers to produce images/documents of improved quality. According to a first embodiment, the printer of the present invention rotates a sheet of paper at different angles with respect to the application of dots onto the paper by one or more print heads. This is achieved, preferably, by mounting the paper on a turntable which can be oriented at the desired angle. Each print head then prints onto the rotated paper. According to a second embodiment, the printer of the present invention rotates the print head while leaving the paper in a stationary position. In both embodiments, the print heads may print different colors (e.g., CMYK) to form a color image or ink or toner of only one color to form a halftone image.

Figure 1:
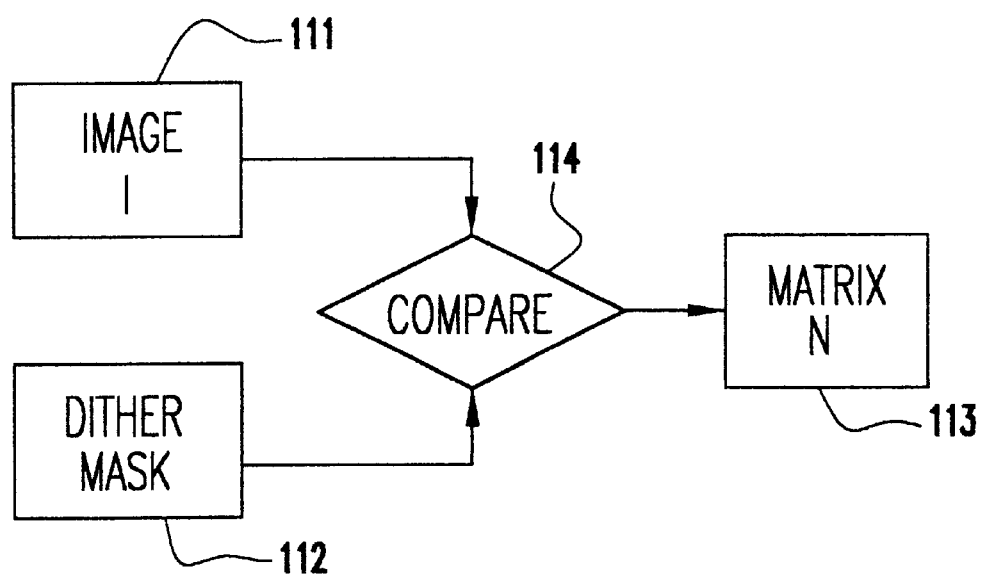
FIG. 1 is a diagram showing a conventional halftoning process using a dither mask.
Figure 2:
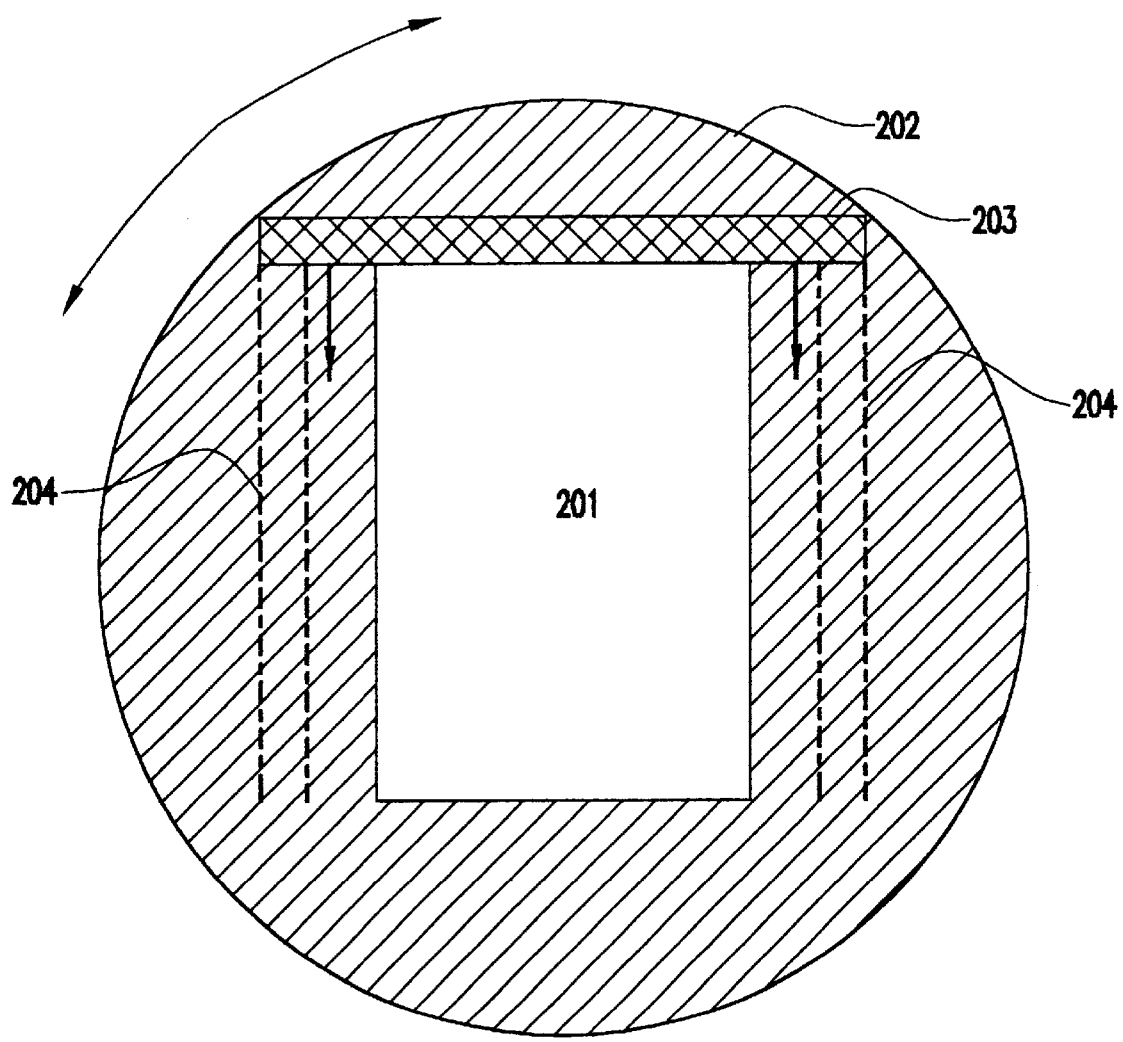
FIG. 2 is a diagram showing a first embodiment of the semi-digital printer of the present invention.

Referring now to the drawings, and more particularly to FIG. 2, a semi-digital printer in accordance with a first embodiment of the present invention includes a print head assembly 203 for delivering ink or toner onto a sheet of paper 201. The print head assembly moves along tracks 204, and the paper 201 is placed on a turntable 202 which is free to rotate clockwise or counterclockwise (as shown by the arrow) to within any angle between −45° and +45°. In contrast to the present invention, in conventional printers, the relative motion of the print heads is strictly perpendicular relative to the paper feed direction.

The sheet of paper 201 may be mounted onto the turntable in any of a number of conventional ways. For example, mechanical stops may be used to guide the paper to an aligned, reference position on the turntable. The stops would then be used to register a corner and edge of the paper. Also, the paper may be held stationary on the turntable by electrostatic charge or vacuum. Then, if necessary, the mechanical stops may be moved so as not to interfere with motion of the print head or removal of the paper from the turntable. Further, the turntable may be oriented in a horizontal position, vertical position, or any angle therebetween, and a housing of the printer may be made large enough to accommodate the orientation of the turntable as well as all of the other features of the printer including the print head assembly.

Figure 3:
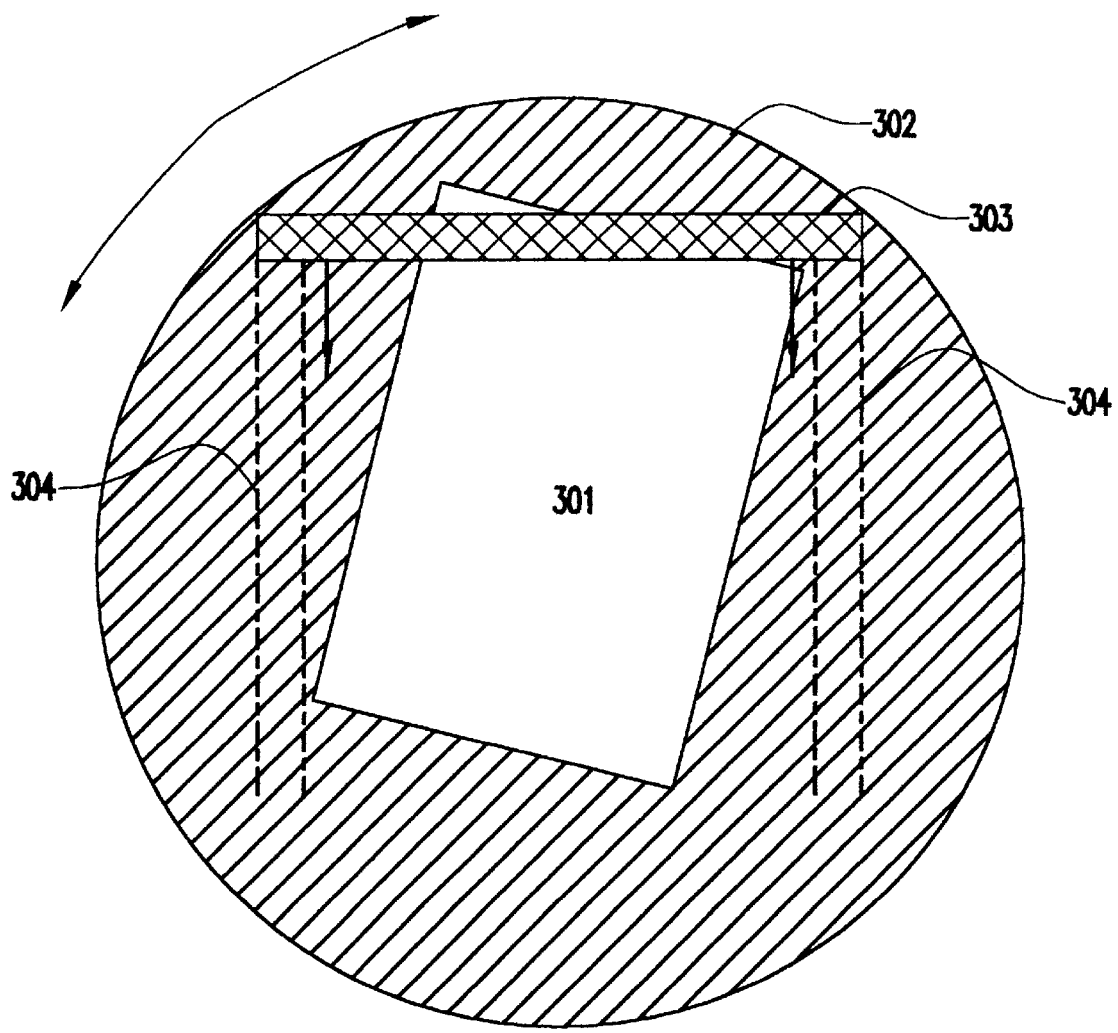
FIG. 3 is a diagram showing how the turntable of the first embodiment of the semi-digital printer of the present invention rotates a paper relative to a print head assembly.

FIG. 3 shows a result of rotation of the paper at precisely 15 degrees. The turntable holding the paper has rotated 15 degrees clockwise. The rotation of the turntable is about an axis perpendicular to the plane of the sheet of paper 201. Because the print head assembly moves along the tracks 304, a precise square lattice at 15 degrees is achieved on the paper, a feature which conventional digital printers cannot attain, i.e., as previously explained, conventional printers must use an approximation of an optimum angle such as 15 degrees (e.g., 14.036 degrees). As a consequence, conventional printers produce images/documents at less than optimal angles and thus will less than optimal print quality.

Through the rotational aspects of the present invention, optimal angles and thus print quality are advantageously achieved. (It is noted that the rotation angle of 15 degrees is merely illustrative. As one skilled in the art can appreciate, virtually any angle of rotation can be performed using the turntable and print head assembly of the present invention. And, because of this angular degree of freedom, a halftone screen can therefore be placed at any desired angle on the paper.)

Figure 4:
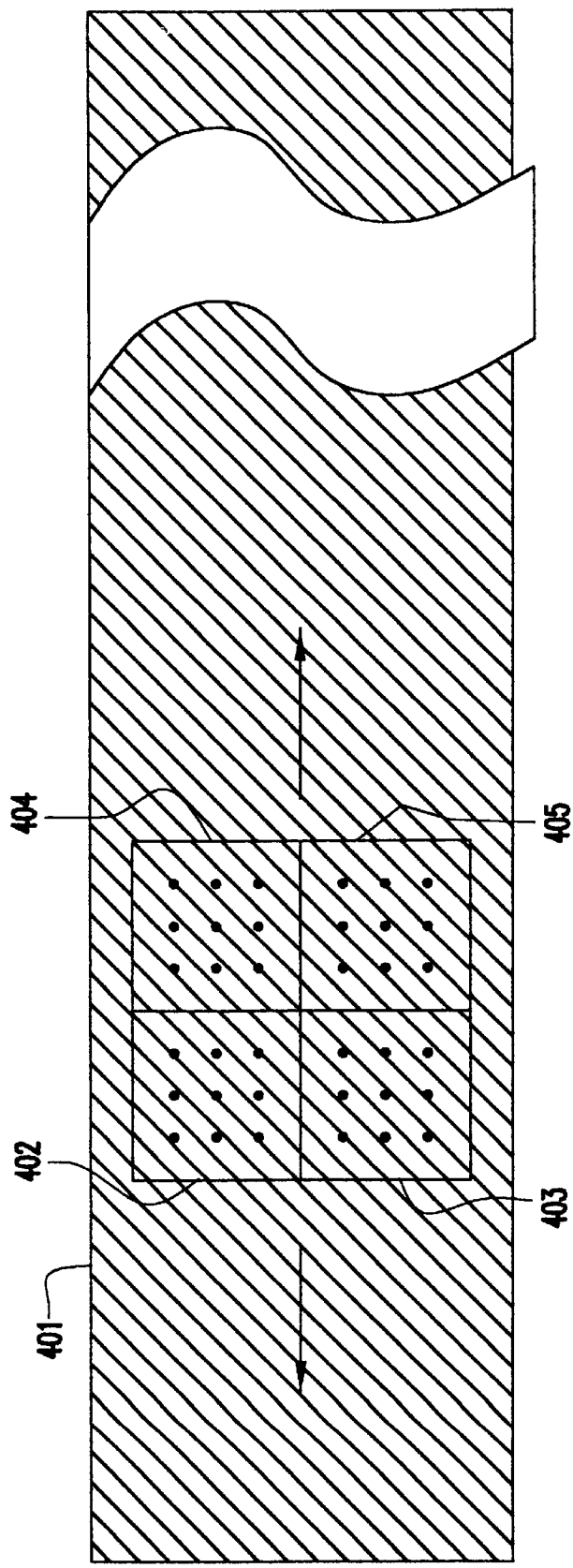
FIG. 4 is a diagram showing a print head assembly which may be used in connection with the first embodiment of the semi-digital printer of the present invention.

FIG. 4 shows a detailed view of one exemplary configuration of print head assembly 203 used in accordance with the present invention. In this configuration, an arm 401 carries four print heads 402, 403, 404, and 405. The arm is capable of moving along the vertical axis, covering the height of the page, while the print heads move horizontally, covering the width of the page. This results in total page coverage. The four print heads are assigned to four colors CMYK, respectively. This can be done in any desired manner. For instance, print head 402 can be cyan, print head 403 can be magenta, print head 404 can be yellow, and print head 405 can be black. Other combinations are also possible. If desired, more or less heads than four may be used.

A process for rotating an image through an angle A about an axis perpendicular to the plane of the paper will now be described. Let x and y represent the row and column coordinates of a pixel in an image to be printed. After rotation through an angle A, the row and column coordinates are transformed to coordinates x' and y' in accordance with the following formula:

$$x' = x \cos A - y \sin A$$
$$y' = x \sin A + y \cos A \quad (1)$$

To complete the rotation, each pixel is transformed to a new pixel location using formula (1) and the rotated image is then re-sampled with a rectangular grid by interpolating the pixels at the transformed locations. This operation is the standard rotation algorithm used in raster image editing programs such as Adobe PhotoShop. Commonly used angles for cyan, magenta, yellow, and black are 15°, -15°, 0°, and 45° respectively. Since the halftone grid is orthogonal, a rotation of 90° is not apparent and -15° mappears as 75°.

Figure 5:
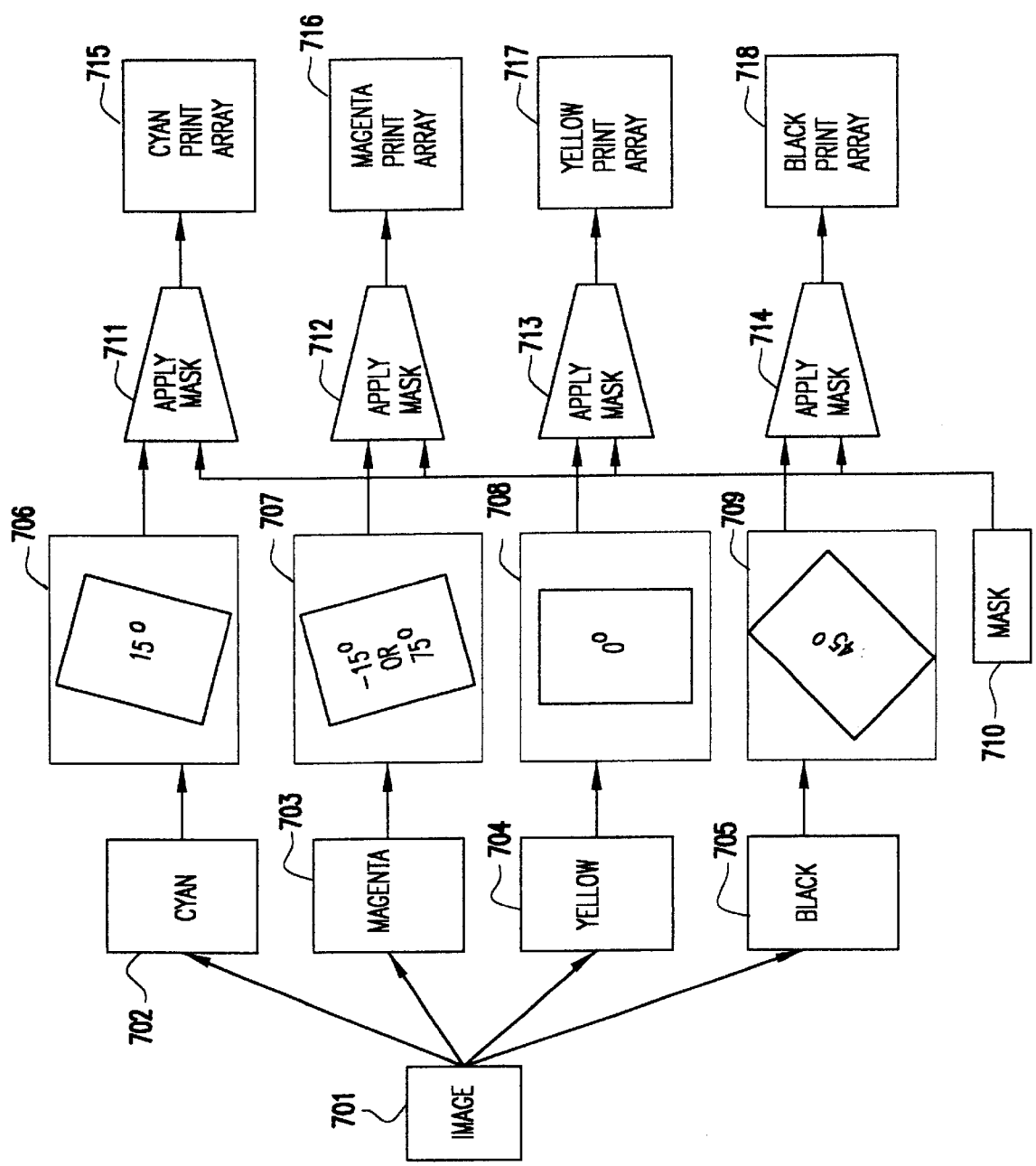
FIG. 5 is a diagram showing processing steps for image data in order to generate halftone data for the print heads in accordance with the present invention.

FIG. 5 shows the overall processing flow for rotation. First, image 701 is separated into printable color planes of cyan 702, magenta 703, yellow 704, and black 705. Each of these color planes is individually rotated by its corresponding angle, A, resulting in a bitmap of the rotated image (706–709). A mask 710, which can be the same for all color planes, is then applied (711–714) to each rotated color plane producing a halftone image for that color plane (71–718). The application of the dither mask can be done in parallel by four processing units or sequentially by a single processing unit. This halftone image is sent to the print head which prints the halftone image on the paper which has been rotated by the same angle A on the turntable.

Alternatively, conventional algorithms may be employed to rotate the image and generate interpolated pixel values. These conventional algorithms include, for example, those used in picture editing programs, which rotate images by arbitrary angles. As for head and turntable control, control software stored in the printer may be used to keep track of the angular position of the turntable using, for example, a position counter and stepper motor or a digital encoding device on the turntable. Coordination of the position of the print head assembly may be performed in a similar manner, as described below with respect to the second embodiment.

An appropriate coordinate transformation as described earlier with respect to formula (1) may be used to calculate the position of dots placed by the print head assembly. For a known rotation angle A, the coefficient of these coordinate transformations can be calculated apriori and stored in a lookup table to speed up the operation.

Figure 6:
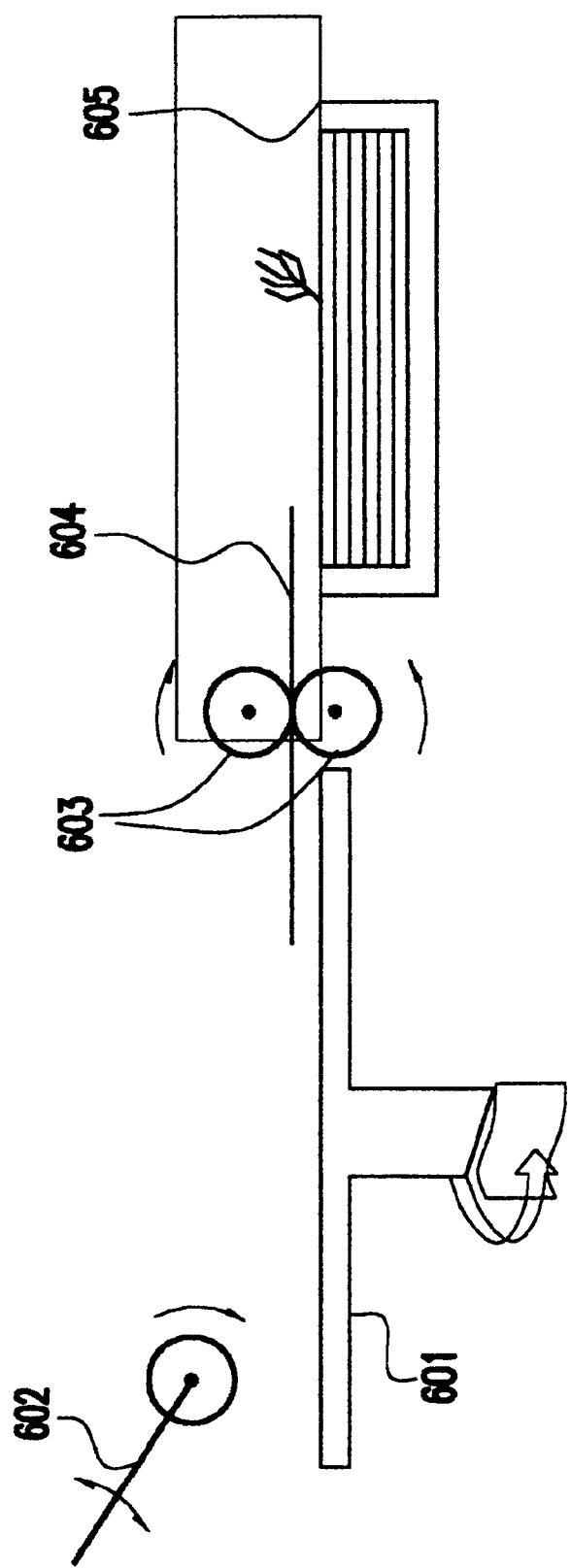
FIG. 6 is a diagram showing a paper transport mechanism for moving paper onto and off of the turntable of the present invention.

FIG. 6 shows a paper transport mechanism for transferring a sheet of paper onto and off of the turntable. In this arrangement, a sheet of paper 604 sitting in a paper tray 605 is moved onto the turntable 601 by means of rollers 603. After printing, the paper is released from the turntable and removed by a moveable roller assembly 602.

Figure 7:
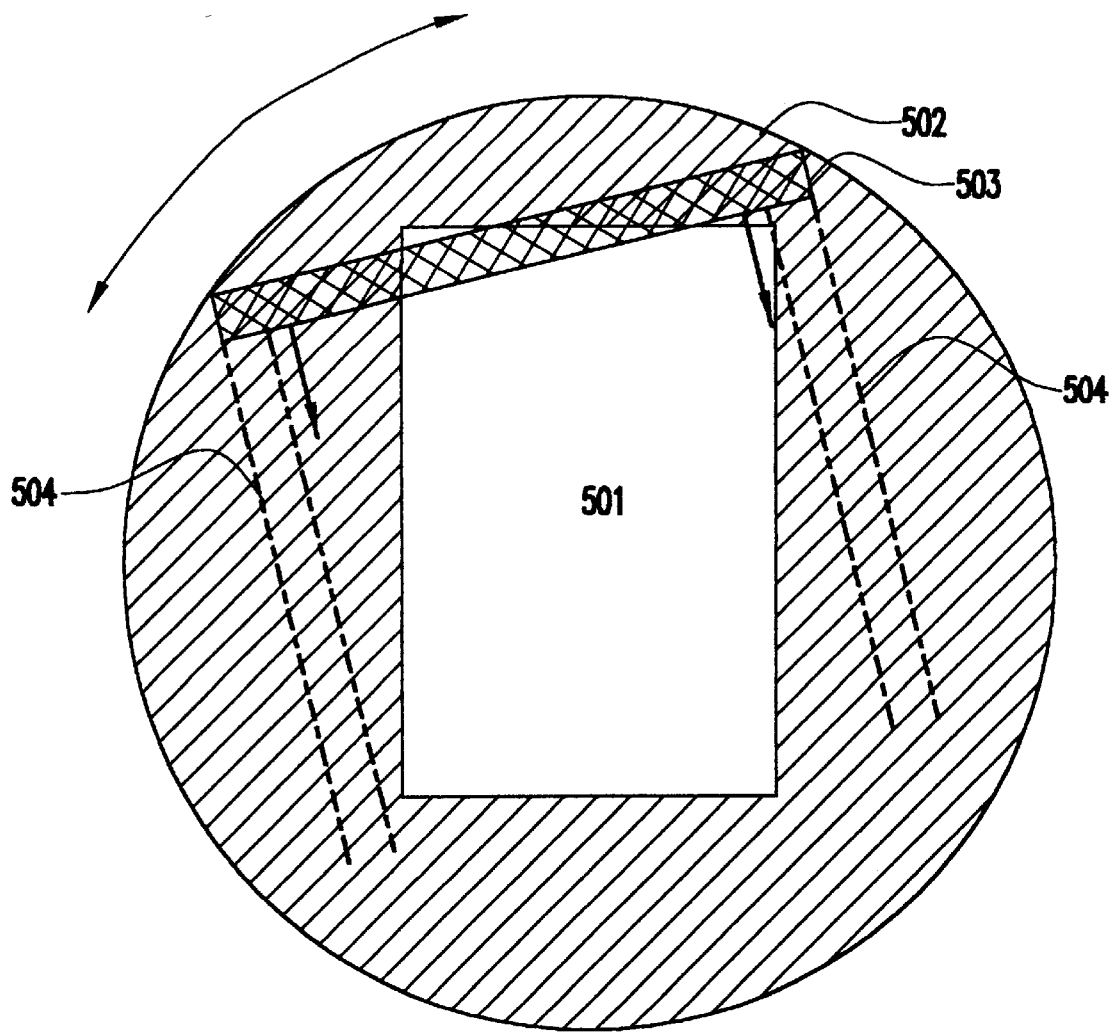
FIG. 7 is a diagram showing a second embodiment of the semi-digital printer of the present invention.

FIG. 7 shows a second embodiment of the semi-digital printer in accordance with the present invention. As shown, the printer of the second embodiment is the same as the first embodiment except that the second embodiment includes a print head assembly 503 which rotates rather than the paper. In operation, print head assembly 503 moves along tracks 504 and delivers ink or toner to a sheet of paper 501. The print head assembly and tracks are placed on a turntable 502 which is free to rotate clockwise or counterclockwise to any angle. In this arrangement, relative angular rotation between the print head assembly and paper is achieved. The paper 501 is stationary during the printing process and is moved out of the turntable after the ink or toner has been placed on it.

The rotation of the turntable of the second embodiment may be performed in a manner analogous to the first embodiment described above, e.g., the print head assembly may be rotated in accordance with formula (1) set forth above but in the opposite direction.

Further, the rotation of the turntable or print head assembly may be achieved through stepper motors, however one skilled in the art can appreciate that other conventional devices for rotation may be used. In addition, or alternatively, the turntable or print head assembly can be rotated until it rests on one of a number of pre-set mechanical stops, which are set according to the desired halftone screen angles.

The printer may be equipped with processor or other computing circuit which executes a control program, stored, for example, in a ROM of the printer, for computing the formula (1) for controlling rotation of the turntable in accordance with the present invention. As those skilled in the art can appreciate, this or another processor may be included in the printer to perform any of the other computations required to implement the invention described herein.

Having thus described our invention, what we claim as new and desire to secure by Letters Patent is as follows:

1. A semi-digital printer, comprising:
   a print head assembly including at least one print head for ejecting one of ink or toner, said print head being digitally controlled and having a limited number of pixel output options;
   a turntable having a surface facing said print head assembly, said surface being adapted for holding a sheet of paper;

means for rotating said turntable to at least one predetermined angle relative to said print head assembly, so that said at least one print head ejects ink or toner onto said sheet of paper at said at least one predetermined angle, wherein at least one of said at least one predetermined angles is neither zero degrees nor a multiple of ninety degrees; and means for halftoning using said limited number of pixel output options, wherein said means for halftoning uses a dithering mask that is the same for any of said at least one predetermined angles.

2. The semi-digital printer of claim 1, wherein said rotating means rotates said turntable so that said at least one print head prints image pixels on said sheet of paper precisely, and without approximation, at said at least one predetermined angle relative to a square lattice which is oriented along an axis perpendicular to a direction of paper feed of said printer.

3. The semi-digital printer of claim 2, wherein said at least one predetermined angle relative to said square lattice is any angle within a range of between −45° to +45°.

4. The semi-digital printer of claim 1, wherein said print head assembly includes a plurality of print heads which eject ink or toner, said rotating means rotating said turntable so that said print heads print ink or toner onto said sheet of paper at different angles of rotation.

5. The semi-digital printer of claim 4, wherein said plurality of print heads print ink or toner of different colors to form a color image.

6. The semi-digital printer of claim 4, wherein said plurality of print heads print ink or toner of a same color to form a halftone image.

7. The semi-digital printer of claim 1, wherein said print head assembly includes a plurality of print heads each printing a different color at a different rotational angle, said printer further comprising:

processing means for re-interpreting a digital input of an image to be printed by said print head assembly in a different coordinate system for at least two of said different colors.

8. The semi-digital printer of claim 1, wherein said printer includes a processing means for computing at least one angle of rotation in accordance with the following formula:

$$x' = x \cos A - y \sin A$$
$$y' = x \sin A + y \cos A \quad (1)$$

where A is said at least one predetermined angle of rotation, said rotating means rotating said turntable based on values obtained as a result of said processing means computing said formula.

9. The semi-digital printer of claim 8, wherein said print head assembly includes a plurality of print heads each printing at a different rotational angle, and wherein said processing means computes a different angle of rotation for each print head, said processing means including:

means for separating an input image into separate printable planes, one corresponding to each print head;

means for individually rotating images corresponding to respective ones of said planes by predetermined angles to thereby generate a bitmap of the rotating images; and printing said rotated images from respective ones of said print heads in said print head assembly.

10. The semi-digital printer of claim 9, wherein each of said planes is a different color plane.

11. The semi-digital printer of claim 7, further comprising a storage device that stores a look-up table containing values corresponding to said formula, said values being computed and stored in said look-up table for one or more predetermined angles of rotation before an image is printed by said print head assembly, said rotating means rotating said turntable based on said values stored in said look-up table.

12. The semi-digital printer of claim 1, wherein said rotating means rotates said turntable within a range of rotation of between of −45° to +45°.

13. The semi-digital printer of claim 1, wherein said rotating means rotates said turntable clockwise and counterclockwise.

14. The semi-digital printer of claim 1, further comprising:

a support arm, said print head assembly being slidably mounted on said support arm to allow said print head assembly to move in a horizontal direction before or during rotation; and a set of tracks, said support arm adapted to move along said tracks to allow said print head assembly to move in a vertical direction before or during rotation.

15. The semi-digital printer of claim 1, wherein a print image output onto said sheet of paper using said print head assembly at said at least one predetermined angle simulates moire avoidance in a print image output from an analog printer.

16. A semi-digital printer, comprising:

a surface for supporting a sheet of paper;

a turntable adjacent said surface;

a print head assembly mounted on said turntable in a position facing said sheet of paper, said print head assembly including at least one print head for ejecting one of ink or toner, said print head being digitally controlled and having a limited number of pixel output options;

means for rotating said turntable to at least one predetermined angle so that said at least one print head ejects ink or toner onto said sheet of paper at said at least one predetermined angle wherein at least one of said at least one predetermined angles is neither zero degrees nor a multiple of ninety degrees, and means for halftoning using said limited number of pixel output options, wherein said means for halftoning uses a dithering mask that is the same for any of said at least one predetermined angles.

17. The semi-digital printer of claim 16, wherein said rotating means rotates said turntable so that said at least one print head prints image pixels on said sheet of paper precisely, and without approximation, at said at least one predetermined angle relative to a square lattice which is oriented along an axis perpendicular to a direction of paper feed of said printer.

18. The semi-digital printer of claim 17, wherein said at least one predetermined angle relative to said square lattice is any angle within a range of between −45° and +45°.

19. The semi-digital printer of claim 16, wherein said print head assembly includes a plurality of print heads which eject ink or toner, said rotating means rotating said turntable so that said print heads print ink or toner onto said sheet of paper at different angles of rotation.

20. The semi-digital printer of claim 19, wherein said plurality of print heads print ink or toner of different colors to form a color image.

21. The semi-digital printer of claim 19, wherein said plurality of print heads print ink or toner of a same color to form a halftone image.

22. The semi-digital printer of claim 16, wherein said printer includes a processing means for computing angles of rotation in accordance with the following formula:

$$x' = x \cos A - y \sin A$$
$$y' = x \sin A + y \cos A \quad (1)$$

where A is said at least one predetermined angle of rotation, said rotating means rotating said turntable based on values obtained as a result of said processing means computing said formula.

23. The semi-digital printer of claim 17, wherein said print head assembly includes a plurality of print heads each printing at a different rotational angle, said printer further comprising:

processing means for re-interpreting a digital input of an image to be printed by said print head assembly in a different coordinate system for at least two of said different colors.

24. The semi-digital printer of claim 22, wherein said print head assembly includes a plurality of print heads each printing at a different rotational angle, and wherein said processing means computes a different angle of rotation for each print head, said processing means including:
means for separating an input image into separate printable planes, one corresponding to each print head;
means for individually rotating images corresponding to respective ones of said planes by predetermined angles to thereby generate a bitmap of the rotating images; and
printing said rotated images from respective ones of said print heads in said print head assembly.

25. The semi-digital printer of claim 24, wherein each of said planes is a different color plane.

26. The semi-digital printer of claim 22, further comprising:

a storage device that stores a look-up table containing values corresponding to said set of formulas, said values being computed and stored in said look-up table for one or more predetermined angles of rotation before an image is printed by said print head assembly, said rotating means rotating said turntable based on said values stored in said look-up table.

27. The semi-digital printer of claim 16, wherein said rotating means rotates said turntable within a range of rotation of between of −45° and +45°.

28. The semi-digital printer of claim 16, wherein said rotating means rotates said turntable clockwise and counterclockwise.

29. The semi-digital printer of claim 16, wherein said turntable further includes:

a support arm, said print head assembly being slidably mounted on said support arm to allow said print head assembly to move in a horizontal direction before or during rotation; and a set of tracks, said support arm adapted to move along said tracks to allow said print head assembly to move in a vertical direction before or during rotation.

30. The semi-digital printer of claim 16, wherein a print image output onto said sheet of paper using said print head assembly at said at least one predetermined angle simulates moire avoidance in a print image output from an analog printer.

* * * * *